United States Patent [19]

Ikuta et al.

[11] Patent Number: 4,756,368
[45] Date of Patent: Jul. 12, 1988

[54] METHOD FOR DRAWING UP SPECIAL CRUDE OIL

[75] Inventors: Yoshiaki Ikuta; Masayuki Moriwaki, both of Tokyo; Masato Kaneko, Hiroshima; Hisazi Matsui, Osaka, all of Japan

[73] Assignees: Mitsubishi Jukogyo Kabushiki Kaisha, Tokyo; Osaka Gas Company Limited, Osaka, both of Japan

[21] Appl. No.: 2,868

[22] Filed: Jan. 13, 1987

[30] Foreign Application Priority Data

Jan. 13, 1986 [JP] Japan ................................ 61-3568
Apr. 16, 1986 [JP] Japan ............................... 61-86162

[51] Int. Cl.$^4$ .................... E21B 37/06; E21B 43/40
[52] U.S. Cl. ................................... 166/267; 166/310; 166/371
[58] Field of Search ............... 166/267, 310, 371, 372, 166/902

[56] References Cited

U.S. PATENT DOCUMENTS

| | | | |
|---|---|---|---|
| 2,698,055 | 12/1954 | Williams | 166/267 X |
| 3,574,319 | 4/1971 | Morgenthaler | 166/310 X |
| 3,580,336 | 5/1971 | Meldau | 166/267 |
| 3,945,435 | 3/1976 | Barry | 166/267 |
| 4,022,277 | 5/1977 | Routson | 166/267 |
| 4,067,391 | 1/1978 | Dewell | 166/267 X |
| 4,223,728 | 9/1980 | Pegg | 166/267 X |
| 4,248,306 | 2/1981 | Van Huisen et al. | 166/267 X |
| 4,269,697 | 5/1981 | Chen et al. | 166/267 X |
| 4,347,899 | 9/1982 | Weeter | 166/372 X |
| 4,407,367 | 10/1983 | Kydd | 166/267 |
| 4,465,138 | 8/1984 | Hunt, III | 166/267 |

*Primary Examiner*—George A. Suchfield
*Attorney, Agent, or Firm*—Toren, McGeady & Associates

[57] ABSTRACT

The present invention relates to a method for drawing up a crude oil containing a great amount of wax or a high-viscosity crude oil. The method of the present invention is characterized by cracking or fractionating the crude oil which has been drawn up, in order to prepare a cracked oil or a gas oil, and by drawing up the crude oil, while injecting a part of the cracked oil or the gas oil into an oil well. According to the present invention, an efficient drawing operation can be achieved.

3 Claims, 3 Drawing Sheets

METHOD FOR DRAWING UP SPECIAL CRUDE OIL

BACKGROUND OF THE INVENTION (1) Field of the Invention

The present invention relates to a method for drawing up a special crude oil such as a crude oil containing a large amount of wax or a high-viscosity crude oil.

(2) Description of the Prior Art

A conventional drawing means for a special crude oil will be described in reference to FIG. 3 attached hereto.

A special crude oil is drawn up from an oil well through a pipe line 3 by means of an oil drawing system composed of a casing 5 and a tubing 6. In this case, the special crude oil loses its fluidity, as it is lifted from an oil layer 4 and as its temperature thus falls, so that there occurs the problem that the tubing 6 is clogged thereby. For the prevention of clogging, while the crude oil is drawn up, a crude gas oil is injected into the oil well through a line 2, or alternatively the clogged materials are removed therefrom mechanically.

Heretofore, in drawing up the special crude oil, the crude gas oil is injected thereinto for the purpose of lowering its pour point, and in such a way, there is the problem that the crude gas oil is not always available and cannot be fed thereto on occasion.

The present invention intends to provide a method for drawing up the special crude oil by which the above mentioned problem can be solved.

SUMMARY OF THE INVENTION

According to the present invention, the above mentioned problem can be solved by combining a drawing system with a cracking treatment process of the special crude oil or a fraction process in drawing up the special crude oil.

That is, the present invention is directed to a method for drawing up a special crude oil which is characterized by drawing up the crude oil containing a great amount of wax or a high-viscosity crude oil, while injecting, into an oil well, a part of a cracked oil obtained by cracking the crude oil containing wax in quantities or the high-viscosity crude oil which has been drawn up through the oil well.

Further, the present invention is directed to a method for drawing up a special crude oil which is characterized by drawing up the crude oil containing a great amount of wax or a high-viscosity crude oil, while injecting, into an oil well, a part of a gas oil obtained by fractionating the crude oil containing wax in quantities or the high-viscosity crude oil which has been drawn up through the oil well.

The present invention can provide the following functional effects:

(1) Since the cracked gas oil obtained by cracking or fractionating the special crude oil produced through the oil well is employed as the gas oil to be injected into the oil well, the miscibility between the special crude oil and the cracked oil is good, thereby facilitating the drawing operation.

(2) The special crude oil which will be subjected to the cracking treatment is a mixture of the special crude oil and the cracked oil injected during the drawing operation, and therefore, cracking conditions can be mitigated and a cracking device can be easily driven under the stationary operation.

(3) Since the produced special crude oil is the mixture of the special crude oil and the cracked oil, the transportation of the product can be carried out with ease.

(4) An amount of the gas oil to be reinjected thereinto is optional and a mixing ratio of the special crude oil and the gas oil also is optional, and therefore, a pour point of the mixed oil can be selected freely between pour points of the special crude oil and the gas oil.

(5) Even if an reinjection amount of the gas oil obtained by the fraction is altered, the circulation of the gas oil can be maintained in the system, and therefore it is not necessary to change the conditions for the fraction process. In consequence, the conditions of the fraction process in compliance with the output of the oil from the oil layer can be kept up by altering the reinjection amount of the gas oil, whereby the operation of the whole system can be easily carried out.

DESCRIPTION OF THE PREFERRED EMBODIMENT

Figure 1:
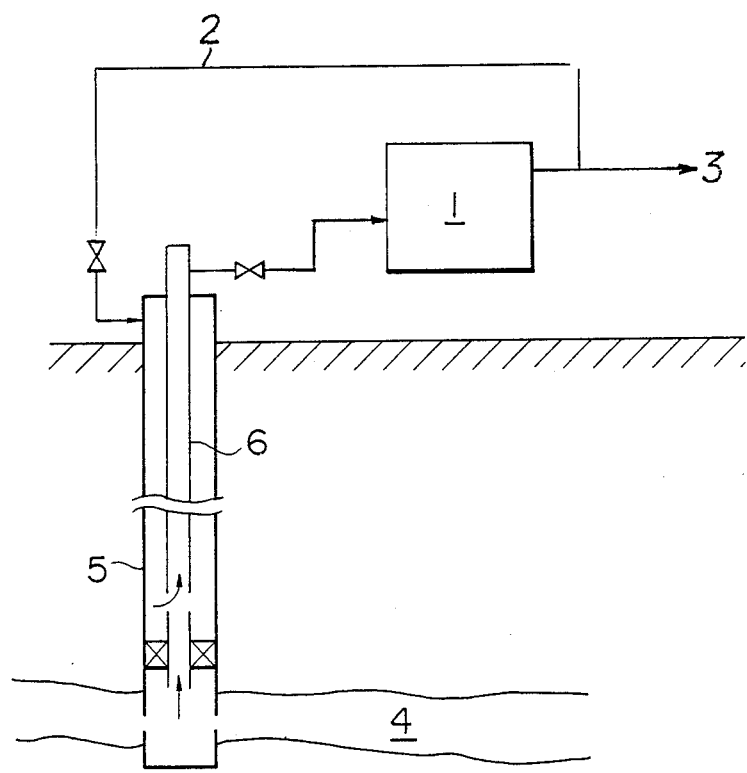
FIG. 1 is an explanatory view of an embodiment of the present invention.
Figure 3:
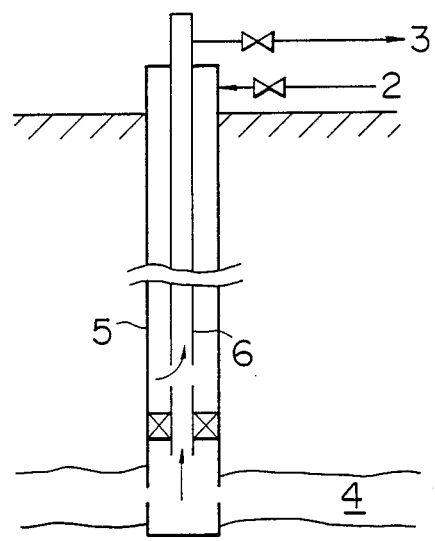
FIG. 3 is an explanatory view of a conventional method for drawing up a crude oil.

Now, an embodiment of the present invention will be described in reference to FIG. 1. In the latter, the same numerals as in FIG. 3 represent the same members as in FIG. 3, and numeral 1 is a cracking process section which is the feature of the present invention.

In the cracking process 1, a special crude oil which has been produced from an oil layer 4 by means of a drawing system (a casing 5 and a tubing 6) is cracked to prepare a thermally treated oil (a cracked oil) having a low pour point. A reinjection line 2 branches off from a pipe line 3 for transporting the oil therethrough which has been cracked, i.e., treated in the cracking process 1, and the line 2 is further connected to the casing 5 of the drawing system. By this constitution, the special crude oil is drawn up therethrough, while the cracked oil is injected thereinto.

The cracking process 1 is operated under a pressure of 5 to 100 kg/cm$^2$G, preferably 10 to 30 kg/cm$^2$G at a temperature of 400 to 500° C. for a period of several hours. In this case, it is preferable to employ the process in which a coking prevention means (e.g., the addition of a trace amount of a coal powder) is taken into account.

The crude oil, shown in Table 1, having a great amount of wax was cracked under conditions of a pressure being 15 kg/cm$^2$G, a temperature being 450° C. and a residence time being 3 hours, in order to prepare a cracked oil, and the latter was then separated from a gas by means of a separator. The properties of the cracked oil are also set forth in Table 1.

TABLE 1

| | (Comparison of Properties between Crude Oil and Cracked Oil) | |
| --- | --- | --- |
| Component (wt %) | Crude Oil before Cracking | Cracked Crude Oil |
| Naphtha ($C_3$ to 170° C.) | 6.3 | 43.7 |
| Kerosine (170 to 232° C.) | 4.3 | 20.1 |

TABLE 1-continued
(Comparison of Properties between Crude Oil and Cracked Oil)

| Component (wt %) | Crude Oil before Cracking | Cracked Crude Oil |
|---|---|---|
| Gas Oil (232 to 343° C.) | 14.2 | 12.0 |
| Gas Oil under Reduced Pressure (343 to 500° C.) | 34.0 | 5.2 |
| Residual Oil under Reduced Pressure (500° C. or more) | 41.2 | 0.5 |
| Solid Content | — | 6.9 |
| [Pour Point (°C.) | 57.5 | −10.5] |

As is definite from Table 1, the cracked oil had an extremely low pour point and simultaneously properties as a gas oil, so that its value was heighten.

When the crude oil having the pour point of 57.5° C. and the cracked oil having that of −10.5° C. in Table 1 were mixed in a ratio of 1:1, a mixed oil having the pour point of 30° C. was obtained. This point of the mixed oil was lower than that of a mixed oil of another gas oil having a similar pour point and the crude oil. This fact indicates a predominance of the present invention in the drawing operation of the crude oil containing a large amount of wax.

Further, for a high-viscosity crude oil, the similar procedure was repeated, and in consequence, the similar results were obtained.

Figure 2:
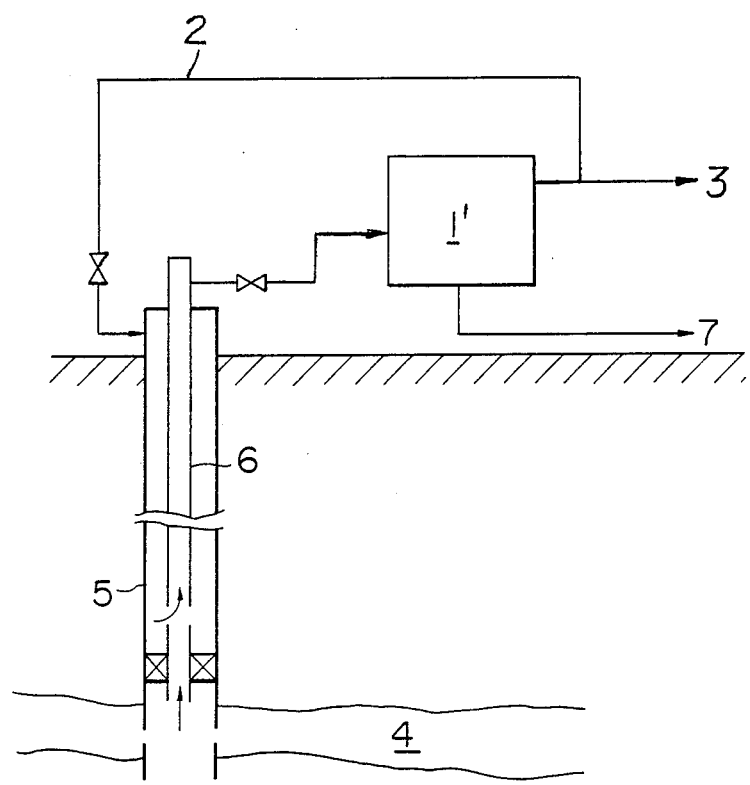
FIG. 2 is an explanatory view of another embodiment of the present invention.

Another embodiment of the present invention will be described in reference to FIG. 2. In the latter, the same numerals as in FIG. 1 represent the same members as in FIG. 1, and numeral 1' is a fraction process section which the feature of the present invention.

In the fraction process 1', a special crude oil which has been produced from an oil layer 4 by means of a drawing system (a casing 5 and a tubing 6) is fractionated into a gas oil having a low pour point and a heavy oil. A reinjection line 2 branches off from a pipe line 3 for transporting the gas oil therethrough which has been fractionated in the fraction process 1', and the line 2 is further connected to the casing 5 of the drawing system. By this constitution, the special crude oil is drawn up therethrough, while the fractionated gas oil is injected thereinto. Incidentally, numeral 7 is a line for taking out the heavy oil therefrom.

The fraction process 1' is operated under a pressure of 0 to 50 kg/cm$^2$G, preferably 0 to 30 kg/cm$^2$G at a temperature of 50 to 450° C.

The crude oil, shown in Table 2, having a great amount of wax was fractionated under conditions of a pressure being 0.5 kg/cm$^2$G and a temperature being 320° C. The properties of the fractionated gas oil are also forth in Table 2.

TABLE 2
(Comparison of Properties between Crude Oil and Cracked Oil)

| Component (wt %) | Crude Oil before Fractionation | Fractionated Gas Oil |
|---|---|---|
| Naphtha (C$_3$ to 170° C.) | 6.3 | 53.6 |
| Kerosine (170 to 232° C.) | 4.3 | 24.7 |
| Gas Oil (232 to 343° C.) | 14.2 | 14.7 |
| Gas Oil under Reduced Pressure (343 to 500° C.) | 34.0 | 6.4 |
| Residual Oil under Reduced Pressure (500° C. or more) | 41.2 | 0.6 |
| [Pour Point (°C.) | 57.5 | −10.5] |

As is definite from Table 2, the fractionated oil thus obtained had an extremely low pour point.

When the crude oil having the pour point of 57.5° C. and the fractionated gas oil having the pour point of −10.5° C. in Table 2 were mixed in a ratio of 1:1, a mixed oil having the pour point of 30° C. was obtained. This pour point of the mixed oil was lower than that of a mixed oil of another gas oil having a similar pour point and the crude oil. This fact indicates a predominance of the present invention in the drawing operation of the crude oil containing a great amount of wax.

Further, for a high-viscosity crude oil, the similar procedure was repeated, and in consequence, the similar results were obtained.

What is claimed is:

1. A method for drawing up a special crude oil by drawing up a crude oil containing a great amount of wax or a high-viscosity crude oil, using a tubing which is placed in a casing that is inserted in an oil layer, comprising injecting crude gas oil between the casing and the tubing; mixing the injected crude gas oil with crude oil being drawn up from the oil layer through the tubing; heating the mixture of crude gas oil and crude oil to obtain a separated crude gas oil; and supplying a part of the separated crude gas oil as the crude gas oil for injection between the casing and the tubing.

2. A method according to claim 1, wherein the mixture is heated in a cracking process for obtaining the separated crude gas oil.

3. A method according to claim 1, wherein the mixture is heated in a fraction process to obtain the separated crude gas oil.

* * * * *